(No Model.)
V. DE ZIEGLER & C. HAGER.
INSTRUMENT FOR ASCERTAINING DISTANCES.
No. 513,377. Patented Jan. 23, 1894.
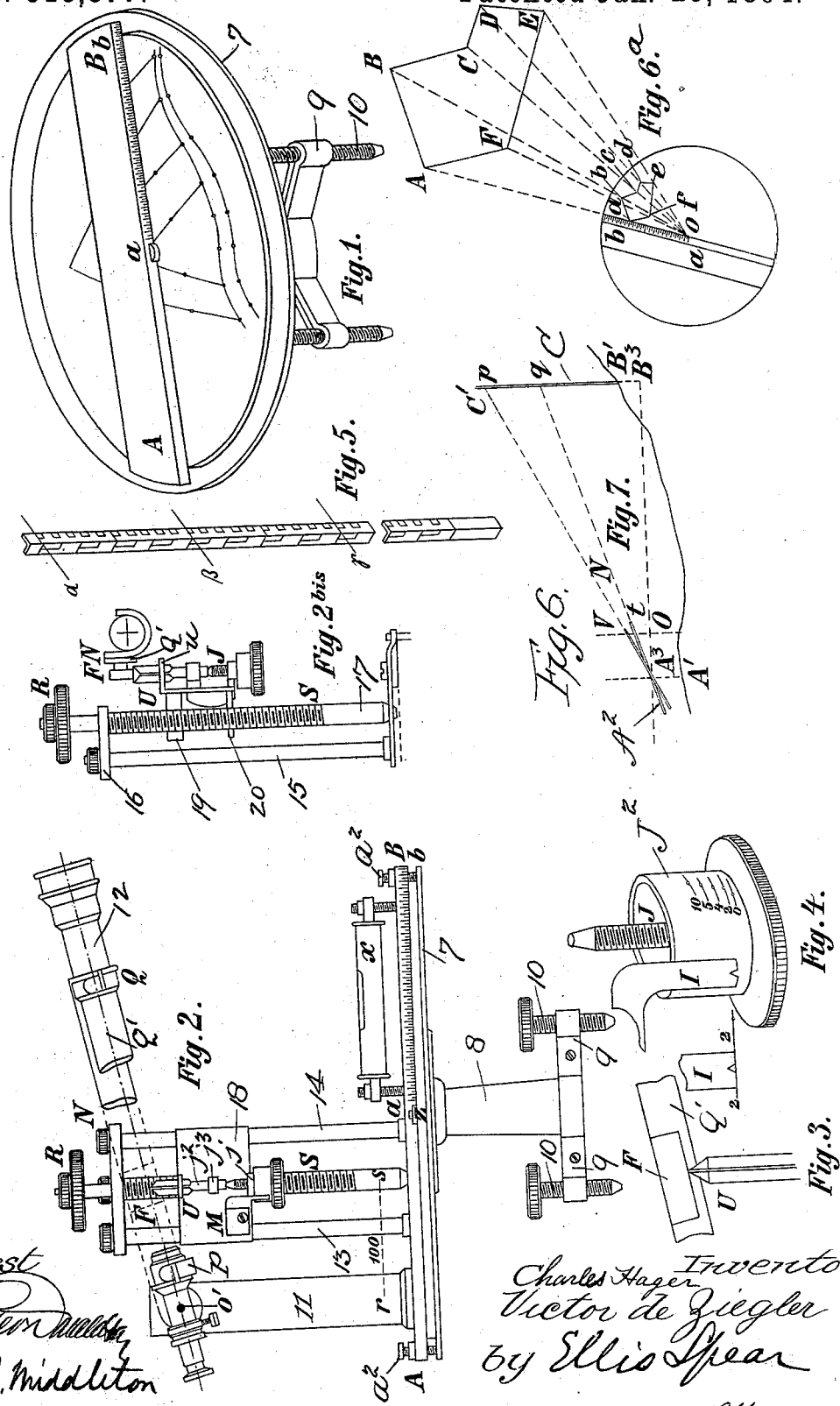

United States Patent Office.

VICTOR DE ZIEGLER AND CHARLES HAGER, OF LUXEMBURG, GERMANY.

INSTRUMENT FOR ASCERTAINING DISTANCES.

SPECIFICATION forming part of Letters Patent No. 513,377, dated January 23, 1894.

Application filed June 12, 1893. Serial No. 477,387. (No model.)

*To all whom it may concern:*

Be it known that we, VICTOR DE ZIEGLER and CHARLES HAGER, engineers, both of Luxemburg, in the Empire of Germany, have invented certain new and useful Improvements in Instruments for Ascertaining Distances, of which the following is a specification.

The object of the invention is to provide a simple and improved instrument which may be used for surveying over any character of ground, such for instance as gardens, hills, valleys or the like without necessitating the operator traveling over the ground surveyed, he remaining at the instrument during the whole time the observation is being taken, thus dispensing entirely with the use of a chain.

It is also our object to provide an instrument by means of which the surveyings in the field may be taken in a very much reduced period of time, and the results there attained will be in such form that the finishing work at the office will be reduced to about one-third the time required by the ordinary methods known to us.

We have also aimed to provide an instrument in which the surveyings can be made with the utmost accuracy.

Our invention is illustrated in the accompanying drawings in which—

Figure 1, is a perspective view of the base plate of our apparatus showing the graduated rule. Fig. 2, is a side view with parts broken away. Fig. $2^b$ is a view of part of the apparatus as seen at right angles to Fig. 2, when looking from the right. Figs. 3 and 4 are detail views. Fig. 5, is a view of the leveling staff, and Figs. 6 and $6^a$ are diagrammatic views illustrating the method of working of the apparatus.

In the drawings we have shown a table or base plate at 7, which is rigidly mounted upon a standard 8 having lugs or projections 9 from its lower end, through which pass thumb screws 10 by means of which it may be secured to or upon a tripod of the ordinary or any desired form. This table is designed to support the paper upon which the reckonings or distances are to be recorded, as indicated, for instance in Fig. 1. Upon this table is placed a flat rule or measure A—B, which is pivotally secured to the table centrally thereof as at Z and may be provided with thumb screws $a^3$ by means of which it may be securely positioned at any desired point. A leveling tube is provided as shown at $x$, by means of which the rule may be kept in a horizontal position when in use. The rule is provided on its edge with graduations starting with zero at the center or pivot point at $z$ and extending toward the end as shown at Figs. 1 and 2. Upon this rule is mounted the distance finding parts which will now be described. A rigid post 11, is provided near the rear end of the rule and to the upper end of this post is secured a telescope 12, by means of a suitable pivotal connection at $o'$ which will permit the telescope to be swung through a vertical plane. The forward portion of the telescope in front of the pivot $o'$ is supported by means of forks or brackets P Q in which the telescope rests so that as the supporting forks are raised and lowered vertically to change the angle of the telescope the forks are permitted to slide along the telescope. The forks are connected by a bar Q' (part of this being broken away in Fig. 2) to which is connected the plate F which is mounted upon the knife edge U, the latter being vertically adjustable as will now be described.

Three vertical posts 13, 14 and 15 mounted upon the ruler, support at their upper ends a plate 16 in which is journaled the upper portion of a screw rod S the lower end being journaled in the ruler. The upper end of the rod S is provided with a thumb nut R whereby it may be turned. An angle plate 18 has rearwardly extending portions or flanges 19 and 20 fitted to slide upon the posts 13 and 14, and being engaged (one or both) by the screw rod by means of which the plate 18 may be quickly elevated or lowered. This plate carries a micrometer screw J screw-threaded into a projection $j$ of the plate 18, and the conical upper end of the micrometer screw supports a short rod or pin $j^2$ sliding vertically in a guide $j^3$, and carrying upon its upper edge a knife edge U, guided in guideway $u$, and upon the upper sharp edge of this knife is mounted the plate F which carries the bar and collars for supporting the telescope. It will thus be seen that the telescope may be quickly adjusted over any considerable angle by the screw S and a more accurate adjustment may be secured by means of the micrometer screw J. The micrometer screw is formed with a collar J² provided with a series of graduations as shown in Fig. 4, and a finger I secured to the plate 18 and extending into proximity to the collar indicates the amount of adjustment given to the telescope by the micrometer screw.

In order that the operation of the instrument may be thoroughly understood we will first explain the theory in connection with Fig. 6.

Suppose a line A′ B′ requires to be surveyed. A² represents the telescope above described having its pivot o′ located at the point A³ which is vertically over the point A′ from which the measurement is to be taken. The axis of the telescope passes during its up or down movement over the vertical line V O. C represents a leveling staff having suitable graduations beginning with zero at the top and extending downward which is located at the point the distance to which it is desired to ascertain. The horizontal line A³, B³ from the pivot of the instrument to a point directly at or in line with the leveling staff it will be observed will be the horizontal projection of the line A′ B′ and hence the actual measurement required. The telescope is first set by means of the screw S to bear on the zero point of the leveling staff and the line A³ $p$ is fixed. This having been done the telescope is turned upon its pivot by means of the micrometer screw J so as to lower the knife edge, the distance V—$t$ equal to one one-hundredth of A³—o (corresponding to $r$—$s$, the horizontal distance between the pivot of the telescope and the vertically movable support. See Fig. 2.) The axial line of the telescope has naturally been lowered on the staff a corresponding amount and it will be seen therefore that the line $p$—$q$ will bear the same ratio to the line A³ B³ that V—$t$ does to A³—o, namely one to one hundred from which we readily see that the line A³—B³ is one hundred times $p$—$q$ and in order to find A³—B³ we have only to multiply $p$—$q$, which is read off through the telescope, by one hundred. The line thus determined may be indicated upon the paper on the table by means of the graduated edge of the ruler 50 as represented in Fig. 1.

In surveying the operation of the instrument will be readily understood on reference to Fig. 6ª, from which it will be seen that the instrument is placed outside of the field or plat to be surveyed, and the distances to the corners are successively determined in the manner described in connection with Fig. 5. As the distance to each corner is ascertained, the proportionate distance is indicated by means of the scale $a$—$b$ on the paper, and the telescope is then rotated on the pivot $a$ until it is in line with the second corner when the operation is repeated. At the conclusion of the operation a complete reproduction will be found on the paper at a greatly reduced scale.

We claim as our invention—

1. In combination the table, the ruler mounted to rotate thereon, a telescope having its rear end pivotally supported above said ruler, a vertically sliding plate carried above the ruler with means for reciprocating it, a support for the forward end of the telescope having sliding connection therewith and a micrometer screw carried by the plate and sustaining the said support, said micrometer screw having graduations bearing a certain known ratio to the horizontal line between the pivot and sliding support, substantially as described.

2. In combination, the table, the ruler mounted to rotate thereon carrying a supporting post, a telescope having its rear end pivotally connected to said supporting post, guiding rods located near the center of the ruler having a plate sliding vertically thereon, a screw rod for adjusting said plate vertically upon said rods, a micrometer screw carried by said plate, and a support for the forward end of the telescope carried upon said micrometer screw, substantially as described.

In witness whereof we have hereunto set our hands in presence of two witnesses.

VICTOR DE ZIEGLER.
CHARLES HAGER.

Witnesses:
GREGORY PHELAN,
GEO. W. ROOSEVELT.